United States Patent [19]
Waite et al.

[11] 3,785,407
[45] Jan. 15, 1974

[54] PIPE COVER SPACER AND DIAMETER COMPENSATOR

[75] Inventors: William Waite; Victor Skuran, both of Chicago, Ill.

[73] Assignee: Transco Inc., Chicago, Ill.

[22] Filed: Dec. 27, 1971

[21] Appl. No.: 211,952

Related U.S. Application Data

[63] Continuation-in-part of Ser. No. 40,102, May 25, 1970, Pat. No. 3,648,734.

[52] U.S. Cl................... 138/108, 138/114, 138/148
[51] Int. Cl............................................. F16l 55/00
[58] Field of Search.................... 138/108, 113, 114, 138/147, 148, 149; 285/47, 138, 139, 140, 141

[56] References Cited

UNITED STATES PATENTS

| | | | |
|---|---|---|---|
| 2,795,108 | 6/1957 | Saldin | 138/148 X |
| 2,707,493 | 5/1955 | Bonvillian | 138/113 |
| 2,763,321 | 10/1956 | Schuster | 138/148 X |

*Primary Examiner*—George E. Lowrance
*Assistant Examiner*—Steven M. Pollard
*Attorney*—Edward C. Threedy

[57] ABSTRACT

A pipe cover spacer and diameter compensator for use with extraction lagging comprising two complementary sections, the sections with the spacers mounted thereon being applied to the exterior of the pipe to completely enclose the latter, with the sections welded or otherwise fastened to each other, thus maintaining spring tension on the spacers. The pipe cover spacer and diameter compensator consists of a plurality of individual, circumferentially arranged, spacing members each having a flat mounting portion abutting and secured to the undersurface of a lagging cover and having a finger extending therefrom and terminating into a relatively flat bendable tab angularly extending from the finger to yieldably bear against the surface of a pipe to resist lateral movement between the cover and the pipe and to compensate for any variation in the space between the cover and the pipe.

1 Claim, 8 Drawing Figures

22 14 20 19 18 20 15 16 10 17 12 11 13 13 19

PATENTED JAN 15 1974 3,785,407
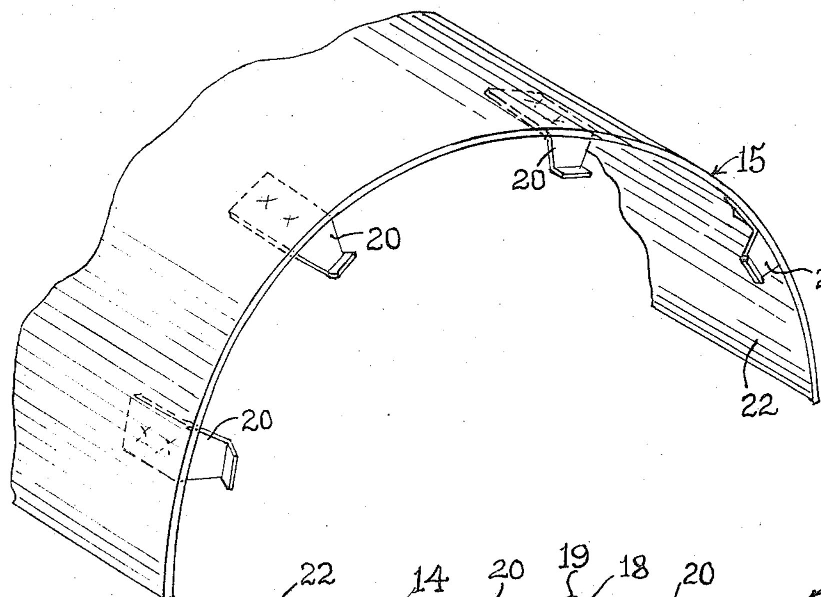
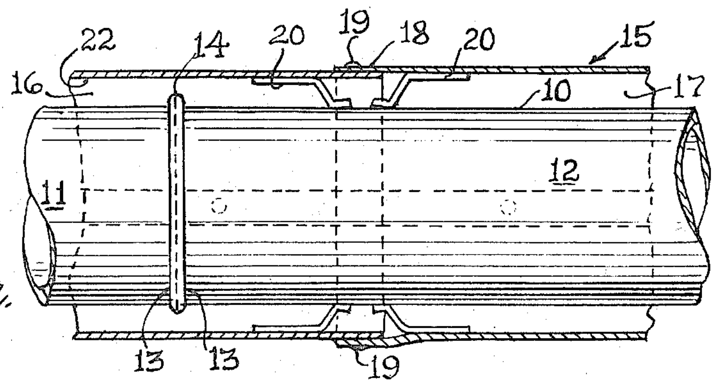
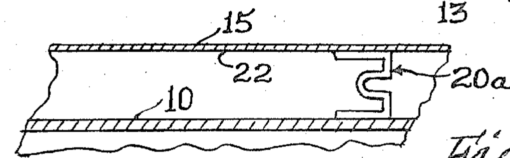
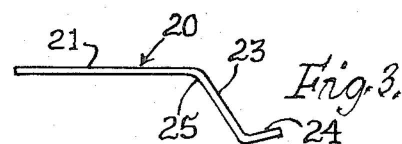
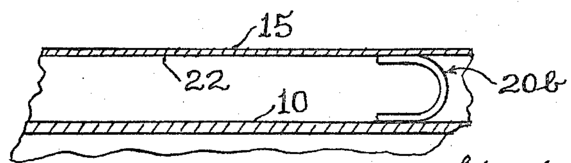
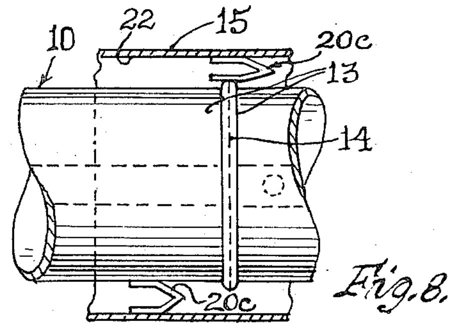
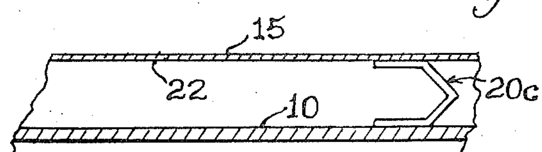
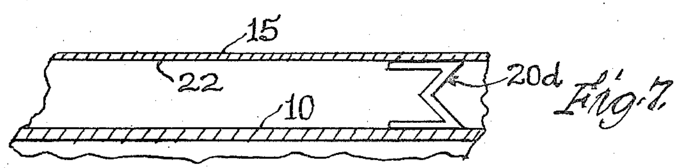
INVENTORS
WILLIAM WAITE &
VICTOR SKURAN
BY Edward C. Threedy
THEIR ATTORNEY

PIPE COVER SPACER AND DIAMETER COMPENSATOR

This application constitutes a continuation-in-part of our copending application Ser. No. 40,102, filed May 25, 1970, now U.S. Pat. No. 3,648,734.

SUMMARY OF THE INVENTION

Our invention is intended for use in connection with a pipe covering, commonly known as "Lagging," in which the covering is formed of semi-circular complementary elongated metal sections arranged to embrace the pipe to be covered thereto, with their abutting longitudinal edge portions in overlapping relation and secured together in pipe covering position by suitable securing means, such as metal screws, spot welding, or the like.

Such cover is larger than the diameter of the pipe to provide a space therebetween. Such space results from the fact that the pipe covered thereby is generally in sections, with the abutting ends of the pipe provided with flanges for securing the pipes together, or secured together by welding. As a result of these flanges or weld joints, the cover on opposite sides of such flanges or welds in the direction of the length of the pipe is spaced, resulting in the creation of an annoying vibration of the cover whenever the contents, such as liquid or the like, is passed through the pipe, especially under pressure.

The object of our invention is to provide a spacer for the cover and to compensate for variation in diameter of the pipe which results by virtue of the aforesaid flanges or weld joints.

The various objects of our invention are accomplished by the preferred form of construction shown in the accompanying drawings, in which:

FIG. 1 is a perspective view of one section of a lagging cover with our spacing members secured thereto;

FIG. 2 is a sectional detail view of a cover and the spacer therefore embracing a pipe;

FIG. 3 is a side elevational view of a spacer member;

FIGS. 4 through 7 are fragmentary sectional detail views of the cover and pipe showing various modified forms of construction of the spacer members; and FIG. 8 is a fragmentary sectional detail view similar to FIG. 2, but showing the spacer member of FIG. 6 in its relationship to the seam between adjacent lengths of pipe.

The pipe to be covered is indicated at 10 and comprises (FIG. 2) a plurality of lengths 11 and 12 having their adjacent end portions 13 arranged in abutting relation with respect to each other and may be welded together as at 14.

A lagging cover is indicated at 15 and comprises elongated lengths each formed of complementary elongated sections 16 and 17 semicircular in cross section, with the lengths having their end portions 18 arranged in overlapping relationship as shown and secured together by any suitable means such as metal screws indicated at 19.

Through the pipe 10 may pass any liquid or other material. When such liquid or other material flows through the pipe either under its normal pressure or is forced or pumped therethrough, a vibration is frequently set up which would be transmitted to the cover 15 if it was in contact with the pipe 10. The weld 14, being of a larger outside diameter than that of the outer surface of the pipe 10, would, if not spaced therefrom, permit the cover 15 to have surface contact with the pipe, with the result that vibrations of the pipe 10 would be transmitted to the cover, creating a vibratory noise or the like, and possible rupturing of the cover.

To prevent this and to compensate for the variation in in diameter of the pipe resulting from the weld joints, we provide a plurality of individual spacer members generally indicated at 20 in FIGS. 1 to 3 inclusive and formed of spring, or suitable bendable, metal. Each of the spacer members 20 at corresponding end portions provides a relatively flat mounting portion 21 for contact with the under surface 22 of the cover 15, in which position (FIG. 2) the mounting portion 21 is secured to the cover by spot welding or the like. As shown in FIG. 1, the spacer members 20 are spaced from each other.

The spacer member 20 has a finger 23 extending downwardly from the flat mounting portion 21 and terminating into a relatively flat bendable tab 24 angularly extending from the finger to yieldably bear in a free state against the surface of the pipe, as shown. The finger 23 is offset with respect to the mounting portion 21 by an angularly extending inclined intermediate web 25.

When assembled in the manner shown in FIGS. 1 and 2, the finger 23 will bear against th surface of the pipe 12, and the tab 24 will be pressed thereagainst by the web 25, thus providing a proper contact with the surface of the pipe and preventing the cover sections from rattling due to vibration of the pipe. The spacer members 20 provide an adequate air space between the cover and the pipe, thereby reducing corrosion to a minimum.

Should the cover 15 be formed of a reflective material, the surface of the cover will act as a reflector, thereby insulating the pipe 10.

In construction, the spacer members 20 may be spaced apart upon the cover 15 as desired and there may be employed such number of spacer members as will best serve the purpose.

Whenever a variation is found between the outside diameter of the pipe and the inside diameter of the cover, the fingers 23 are bent by any suitable tool to engage the pipe 10 and thus compensate for any diameter variation thereof. In such adjusted position of the fingers 23, the tabs 24 will yieldably bear against the surface of the pipe 10. These tabs 24 serve the additional function of preventing the ends of the fingers 23 from cutting into the pipe, which eventually might result in a line of weakened union, thus rupturing or otherwise damaging the pipe.

In FIGS. 4 through 7, we have shown modified forms of spacer members. Each of the spacer members **20*a–d* has its upper flat surface secured to the under surface 22 of the cover 15 by welding or the like, with the unsecured end of the spacer member bearing upon the pipe 10**. The form of construction of each of these spacer members is apparent from FIGS. 4 through 7.

It is desirable to locate a plurality of spacer members with respect to the cover 15 in a manner such that they will have bearing contact upon the weld seam 14 of the pipe 10 as shown in FIG. 8. The spacer member **20*c* (FIG. 6) may be secured to the cover 15 in a location such that the spacer members 20*c* will bear upon the seam 14 of the pipe 10**, assuring an effective means of maintaining tight surface contact with the pipe and eliminating undesirable vibration.

All of the forms of construction shown in the drawings may be factory assembled, thus requiring no cutting or fitting of the parts on the job, the bending of the tabs 24 being accomplished by any suitable tool.

If desired and if required, the cover and spacer members may be held tightly against the pipe by means of suitable straps or the like which encircle the pipe cover 15. Such straps do not form any part of this invention.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described my invention, what I claim as new and desire to protect by Letters Patent is:

1. An improvement in a pipe cover spacer and diameter compensator for attachment to a lagging cover surrounding a pipe comprising a. a spacer member formed of spring material and adapted to be disposed between the cover and the pipe, b. said spacer member comprising a relatively flat substantially rectangularly shaped mounting portion fixedly secured as by welding to the underside of said said cover, and c. a yieldable finger angularly extending away from said flat mounting portion longitudinally of the cover and with its side edges converging and terminating into a free-standing tab adapted to have free yieldable contact with the pipe when the cover is mounted thereon.

* * * * *